United States Patent
Domrow et al.

(10) Patent No.: US 10,177,968 B2
(45) Date of Patent: Jan. 8, 2019

(54) MULTIPATH DRIVER COGNITIVE ANALYSIS

(71) Applicant: International Business Machines Corporation, Armonk, NY (US)

(72) Inventors: Gary S. Domrow, Austin, TX (US); Lee N. Helgeson, Rochester, MN (US); Ian A. MacQuarrie, San Jose, CA (US); James A. O'Connor, Ulster Park, NY (US); Shawn T. Wright, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 15/347,896

(22) Filed: Nov. 10, 2016

(65) Prior Publication Data

US 2018/0131562 A1    May 10, 2018

(51) Int. Cl.
*G06F 3/06* (2006.01)
*H04L 12/24* (2006.01)
*H04L 29/08* (2006.01)
*H04L 12/703* (2013.01)
*H04L 12/707* (2013.01)

(52) U.S. Cl.
CPC ............ *H04L 41/0677* (2013.01); *G06F 3/06* (2013.01); *H04L 41/0668* (2013.01); *H04L 45/24* (2013.01); *H04L 45/28* (2013.01); *H04L 67/1097* (2013.01)

(58) Field of Classification Search
None
See application file for complete search history.

(56) References Cited

U.S. PATENT DOCUMENTS

2005/0188239 A1    8/2005  Golasky et al.
2005/0276214 A1   12/2005  Phelan et al.
(Continued)

OTHER PUBLICATIONS

Gary S. Domrow, et al., Pending U.S. Appl. No. 15/434,471 entitled "Multipath Driver Cognitive Coordination ," filed with the U.S. Patent and Trademark Office on Feb. 16, 2017.
(Continued)

*Primary Examiner* — Christopher M Crutchfield
*Assistant Examiner* — Alan L Lindenbaum
(74) *Attorney, Agent, or Firm* — Cantor Colburn LLP

(57) ABSTRACT

An aspect includes detecting a recurring intermittent error in a path of a network in a system that includes at least one data transmission port configured for connection to at least one shared data storage device via a plurality of paths of the network. It is determined whether a cause of the recurring intermittent error is a previous path recovery action. In response to determining that the cause of the recurring intermittent error is not a previous path recovery action, the data transmission port is prevented from accessing the path for a specified time period by moving the path into a degraded sub-state, and subsequent to the specified time period the data transmission port is provided access to the path. In response to determining that the cause of the recurring intermittent error is a previous path recovery action, the data transmission port is provided access to the path.

15 Claims, 8 Drawing Sheets

(56) References Cited

U.S. PATENT DOCUMENTS

| | | | |
|---|---|---|---|
| 2006/0075156 A1* | 4/2006 | Okaki | G06F 11/201 710/17 |
| 2008/0266127 A1 | 10/2008 | Bajpay et al. | |
| 2009/0190466 A1* | 7/2009 | Girardi | H04L 41/0681 370/216 |
| 2014/0053014 A1* | 2/2014 | MacQuarrie | G06F 11/0793 714/4.2 |

OTHER PUBLICATIONS

List of IBM Patents or Patent Applictions Treated as Related; (Appendix P), Filed Jul. 26, 2017, 2 pages.

* cited by examiner

MULTIPATH DRIVER COGNITIVE ANALYSIS

BACKGROUND

The present invention relates to computer storage, and more specifically, to multipath driver cognitive analysis to mollify the impact of storage area network (SAN) recurring intermittent failures.

Complex SAN configurations have become prevalent in many computer systems. SANs enable a large number of servers to access shared storage via a switch network, often a fiber channel. The switches used to interconnect servers to shared storage are critical to the reliable operation of the system. The network is often architected and configured to be fully fault tolerant with a high degree of redundancy so that both solid and intermittent path failures can be detected, and automatic in-line recovery initiated to remedy the problem or reroute data packets around faults to prevent system outage and loss of access to data.

Traditionally faults are often viewed as falling into one of two categories, permanent and temporary faults. Solid faults resulting from complete failure of a hardware component are perhaps the easiest to understand. These types of failures are normally permanent, where fault tolerance and recovery are accomplished via redundancy, and alternate paths through the different hardware in the network are utilized to circumvent the fault. A solid failure in a network is typically recovered by taking the path offline and channeling packets through a redundant path interconnecting a server to storage.

The second types of traditional faults are referred to as temporary intermittent failures as they are temporary and transient in nature. These type of failures can arise from numerous sources including bit flips in electronics due to alpha particle or cosmic rays, electrical noise from intermittent contacts, fiber optic transceivers (e.g., small form-factor or "SFP") starting to lose light intensity, or code defects to name a few. These can produce temporary faults which are normally viewed as one time incidents that can be remedied via a single recovery action such as a path retry operation. For both extender ports (E-ports) and fabric ports (F-ports), intermittent errors can cause many different events such as state changes, protocol errors, link reset, invalid words, cyclical redundancy checks (CRCs), and class-3 discards (C3TX_TO), as well as other conditions. Since data packets flowing from servers to shared storage traverse a large number of switches and links interconnecting the switches and devices, the precise component(s) associated with the faults may not be apparent.

The underlying problem in a SAN often does not produce a red light error indication so symptoms of a failure may be limited to symptoms such as a small computer system interface (SCSI) command time-out visible at the server. Since the paths from servers to shared storage do not have a permanent affinity with specific switches and links between switches, the failure may surface only intermittently even in the presence of a recurring link failure. Even specific paths themselves may fail intermittently because they share inter-switch links (ISLs) between switches which use different ISLs dynamically. An intermittent network failure can be elusive and difficult to pinpoint and isolate when a command timeout operation via higher level software is the only indication.

Thus, a third category of failures, pervasive intermittent faults, has surfaced as difficult to isolate and resolve since the underlying problem cannot be contained within the network itself and in most cases the network is not capable of producing actionable fault indications that would enable prompt response and resolution from the network administrator. As the transmission rates and complexity of high speed networks has continued to increase over time, this third type of fault has become more common and problematic with SAN operation. Pervasive intermittent faults are not one time events, but are normally not solid component failures either. These faults are intermittent in nature, but reoccur soon after recovery is believed to have been completed successfully. This can put the system into reoccurring recovery loop known as a recovery storm, placing repeated back pressure on the network. Repeatedly stopping or slowing network traffic can eventually cause application level performance issues and even application failure. It can also cause false triggers resulting in servers failing over unnecessarily to back up servers.

SUMMARY

Embodiments include a method, system, and computer program product for multipath driver cognitive analysis. A method includes detecting, by a processor, a recurring intermittent error in a path of a network in a system that includes at least one data transmission port configured for connection to at least one shared data storage device via a plurality of paths of the network. It is determined whether a cause of the recurring intermittent error is a previous path recovery action. In response to determining that the cause of the recurring intermittent error is not a previous path recovery action, the data transmission port is prevented from accessing the path for a specified time period by moving the path into a degraded sub-state, and subsequent to the specified time period the data transmission port is provided access to the path. In response to determining that the cause of the recurring intermittent error is a previous path recovery action, the data transmission port is provided access to the path.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
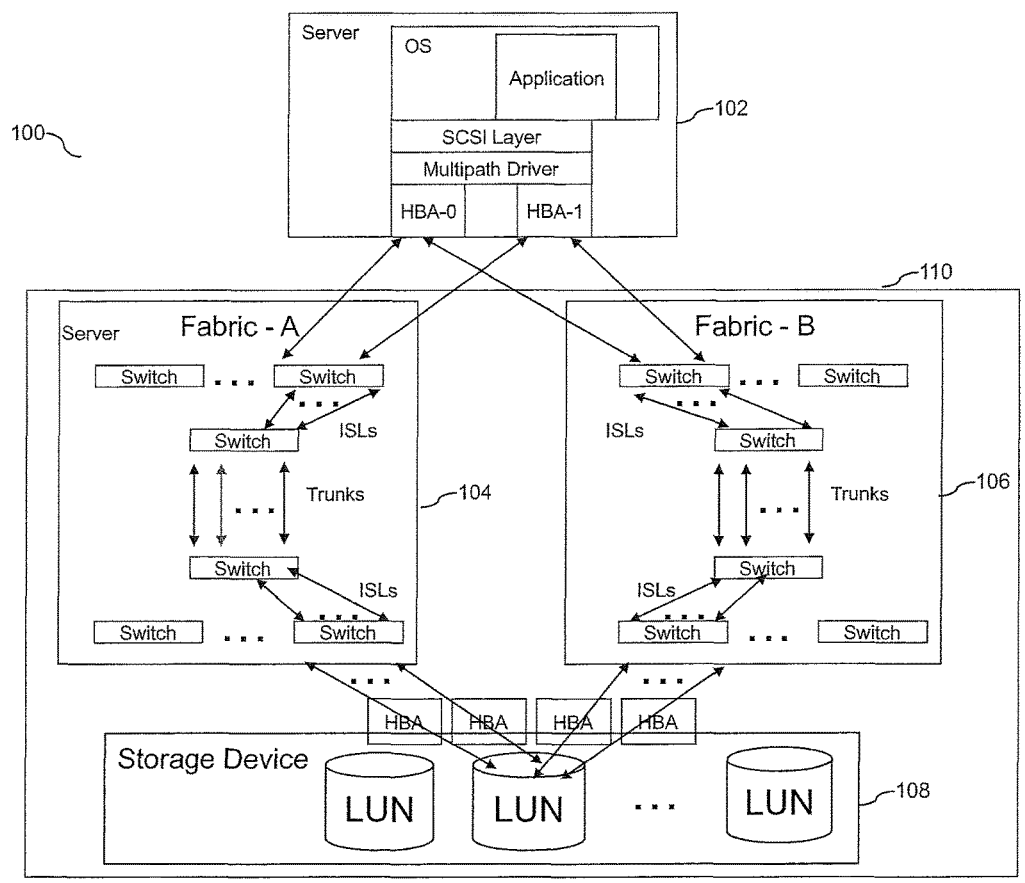
FIG. 1 illustrates a block diagram of a system that includes a storage area network (SAN) hierarchy in accordance with one or more embodiments.

Embodiments described herein provide multipath driver cognitive analysis to mollify the impact of storage area network (SAN) recurring intermittent failures on system and application performance. One or more embodiments described herein utilize knowledge of past performance and analysis of this historical fault data to assess and mollify long term transmission quality. This allows multipath drivers to independently detect and take action to resolve recurring error conditions, thus providing significant benefits in high availability environments when compared to contemporary multipath drivers. One or more embodiments described herein utilize a collection of recorded historical data representing past failure and recovery events for each path within a SAN network along with path management algorithms that analyze historical fault data to assess and mollify long term transmission quality of the paths and perform path management activity based on a defined criteria. Past performance of network paths is often the leading and most reliable indicator of future path performance. In accordance with one or more embodiments, additional path states are implemented to identify and handle path failures that result from transient recovery operations. Path failures resulting from transient recovery operations are handled differently than traditional path failures in order to avoid disabling a path when a recovery operation is still in process.

When two completely independent fabrics are used, as is often the case for implementations requiring a high level of availability, recovery actions such as device reset and logical unit number (LUN) reset may cause anomalous behavior on a completely healthy fabric. In accordance with one or more embodiments, information about recovery actions is input to the multipath driver cognitive analysis of both independent fabrics. One or more embodiments described herein can be utilized whether or not lower level recovery is on or off in the network (e.g., the SAN). One or more embodiments described herein include enhancements to work in conjunction with lower level recovery in the network when it is available.

Some contemporary multipath drivers include rudimentary cognitive capabilities to identify and treat repeated recovery events associated with a recurring failure condition as a collection of events versus a single isolated event. These contemporary rudimentary cognitive capabilities do not address the third category of failure events described above that is, recurring intermittent failure conditions. Contemporary multipath drivers take action to remedy problems on what is seen as individual and disparate events. Path management functions to remove and return paths to service are determined based on the outcome of these individual events.

For example, when a command failure is encountered in contemporary systems, the recovery action can involve a retry operation on the same or an alternate path. If one or more subsequent command operations fail on the same path, depending on the thresholds in place, the path will be determined to have failed and the path will be removed from service (failure category of permanent failure is assumed). If subsequent commands are successful, the error will be considered temporary (failure category of temporary intermittent failure is assumed) and the path will remain in service. Multipath software (e.g., PCM) may leverage a path reclamation function that periodically tests the availability of each path through the network. If the path test is successful on a path that had previously been removed from service, that path will be placed back in service. This could mean there was a repair of faulty hardware that has been completed. It could also be in response to the recurring intermittent failure. The multipath software will either leave the failing path in service or remove the failing path from service only to return it to service a short time later following a successful completion of the path test performed by the path reclamation function. A behavior regularly observed as a result in contemporary systems, is continuous cycling of paths between off-line and on-line states. It can be seen that based on the application of such logic for both removing and returning paths to service that the implementation of the contemporary multipath drivers are not capable of responding appropriately to temporary yet recurring failure conditions and are therefore not likely to be effective at isolating servers from the negative effects of this condition.

Retry operations typically stop or slow down traffic on the path encountering a failure while recovery is in progress. This can place back pressure on the network, temporarily reducing bandwidth. Nevertheless this is normal, expected and usually well tolerated even under high load when recovery is successful and when the fault is truly a one-time intermittent error.

Since the specific condition(s) associated with these type of recurring intermittent failures, sometimes referred to as "sick-but-not-dead" network problems can at times be hard to detect and difficult to isolate, the ability to recover from these faults via higher level software would be extremely useful. The exposure to intermittent link failure where failing links continue to cycle paths between the on-line and off-line states can be mollified via recognition of the condition in the multipath driver and then treating it appropriately. Nevertheless this is not trivial since the multipath driver may only be able to attempt to interpret visible symptoms without direct knowledge of the underlying issue. In addition, the goal of recovery is to keep good paths on-line so recognizing specific conditions as to when a path is encountering repeated intermittent faults and should be taken off-line can be challenging. Further, normal system operations, especially to server and storage attached to the network, such as concurrent firmware updates might also trigger false positives.

Detecting a problematic path, making the decision to take it off-line as a result of encountering an error condition and then subsequently deciding to bring the path back on-line is typically done following the successful completion of a health check command to test the path. The health check command runs as part of the path reclamation service and is intended to restore functioning paths, however with recurring intermittent error conditions, paths may pass the heath check and be brought back online only to fail again a short time later. Depending on the nature of the error condition encountered, it is possible for paths to cycle between states at a rate high enough to result in performance degradation.

Multipath drivers currently available in the industry have traditionally performed path management activity (on-line/ off-line paths) based on individual error recovery events. Once the recovery for the individual event is complete and path management decisions are made and executed, no further consideration is made in regard to that event. Although this is an effective approach for both persistent error conditions as well as isolated temporary events, it may not effectively address recurring intermittent error conditions. As a result, contemporary multipath solutions are not capable of taking action to prevent recurring failure conditions from continuing for an extended period and therefore servers can be left exposed to the potentially debilitating effects.

One approach to adding rudimentary cognitive capability to multipath drivers is to enhance existing path control modules (PCMs) and/or multipath drivers. New analysis software functionality can be added that provides detection and recovery mechanisms that detect the signature for recurring intermittent failure and then treating them more like a solid failure by more permanently disabling the path. This technique can be implemented to improve error handling for recurring intermittent error conditions and the impact to servers that occurs as a result of the associated error recovery. In accordance with one or more embodiments, this approach can introduce a new device attribute referred to as 'timeout_policy' that provides options to manage a path health check and path selection algorithm. The options can include retry_path, fail_path, and disable_path. A path (not the last path) is set to a failed state if an I/O fails with a time-out error. To recover a failed path from an I/O time-out, the analysis software can be enhanced to include algorithms that exploit these timeout policy setting options: retry_path—the algorithm works in the same way as some contemporary PCMs and/or multipath drivers, when a health check command succeeds, a timeout failed path will be recovered immediately; fail_path—in this case two (or some other programmable threshold number) consecutive successful health check commands are required to recover a timeout failed path, this can be the timeout policy default state; and disable_path—in this case if a timeout failed path continuously experiences a health check command timeout twice (or some other programmable threshold number) within a certain period of time, or the path has a failed command with a timeout three (or some other programmable threshold number) times or more total, the path will be set to a disabled (offline) state and it will stay in the disabled state until a user manually recovers it.

Two additional hierarchical and complementary timeout counts, cumulative timeout and sequential timeout, can also be utilized. With a cumulative timeout, when the cumulative count for a command timeout reaches a specified threshold within a specified time period (e.g., three within fifteen minutes) the path is disabled when disable_path is set. With a sequential timeout, when three (or some other programmable threshold number) of path timeouts are encountered the path will be disabled when disable_path is set independent of the duration of time. The sequential timeout only triggers for continuous timeout error counts, and whenever a successful I/O occurs, this sequential timeout count will be reset to zero. The use of these additional timeout counts can improve handling of intermittent failures, but they require a system operator to manually reactivate paths after a repair is performed. In addition, if a failure is intermittent, taking a path offline for a specified amount of time may be preferable to taking the path off line until it is manually reactivated by an operator.

One or more embodiments described herein can reduce the risk of impact to the system (e.g., performance) by placing a path in a "degraded state" when analysis software detects an abnormal condition that may potentially be a recurring intermittent failure. While in this state, the multipath driver temporarily avoids using the path and thus prevents the cycling phenomena, but does not permanently disable the path. While in a degraded state, the multipath driver periodically tests the path by issuing several health checks. In addition, the interval between each health check is increased as well in the PCM and/or multipath driver. The results are analyzed, and if the cognitive software determines that the link is now fully functional it is returned to normal use. Because specific components and/or conditions associated with these types of temporary/recurring failures in the network are often difficult to isolate, the ability to automatically detect and respond to these failures from within the multipath driver can be important to maintaining a high quality of service.

Turning now to FIG. 1, a block diagram of a system 100 that depicts a SAN hierarchy is generally shown in accordance with one or more embodiments. The system 100 shown in FIG. 1 shows a server 102 that includes an operating system (OS), an application being executed by the OS, a SCSI layer, a multipath driver, and two host bus adapters (HBAs) that are used to retrieve data requested by the application. As shown in the embodiment of FIG. 1, both of the HBAs are connected to network fabric A 104 and network fabric B 106 of a SAN network 110 via edge switches. Network fabric A 104 includes switches, inter-switch links (ISLs), and trunks that collectively implement network paths one through ten. Network fabric B 106 includes switches, ISls, and trunks that collectively implement network paths eleven through twenty. HBAs connect the paths of network fabric A 104 and network fabric B 106 to the storage devices 108 that are shown in FIG. 1 as being identified by logical unit numbers (LUNs). Thus, each HBAs acts as a data transmission port that is configures to be connected to at least one of the storage devices via a plurality of paths in the SAN network. The storage devices 108 can include any type of storage such as volatile and non-volatile memory devices, storage management systems, and storage controllers. The multipath driver shown in the server 102 of FIG. 1 is configured to access the storage devices 108 via a plurality paths (e.g., paths one through twenty) of the network fabric A 104 and network fabric B 106. Each of the paths may comprise a different combination of switches and ISLs, and trunks. As shown in FIG. 1, two independent network fabrics, fabric A 104 and fabric B 106 are provided so that even if all of the paths in one of network fabrics were to become disabled, a path through the other network fabric would continue to be utilized.

As used herein, the term "degraded state" indicates a path that has had a recent failure that may be a recurring intermittent failure.

As used herein, the term "SCSI-2 reserve" refers to SCSI reservations that are used to control access to a shared SCSI device such as a disk or tape drive. An initiator sets a reservation on a LUN in order to prevent another initiator from making changes to the LUN. This is similar to the file-locking concept. SCSI reservations are always set by a host initiator (e.g., the multipath driver on the server 102). In accordance with one or more embodiments, the same initiator performs a SCSI release on the affected LUN.

As used herein, term "unit attention" or "UA" refers to indications that the operating mode has changed from the last command sent. It is reported on all SCSI commands except for inquiry. In accordance with one or more embodiments, a UA indicates that that a LUN reset or a device reset occurred.

As used herein, the term "reserved path" refers to the path on which the SCSI-2 reserve is sent, it is the path that has access to the LUN at the time.

Figure 2:
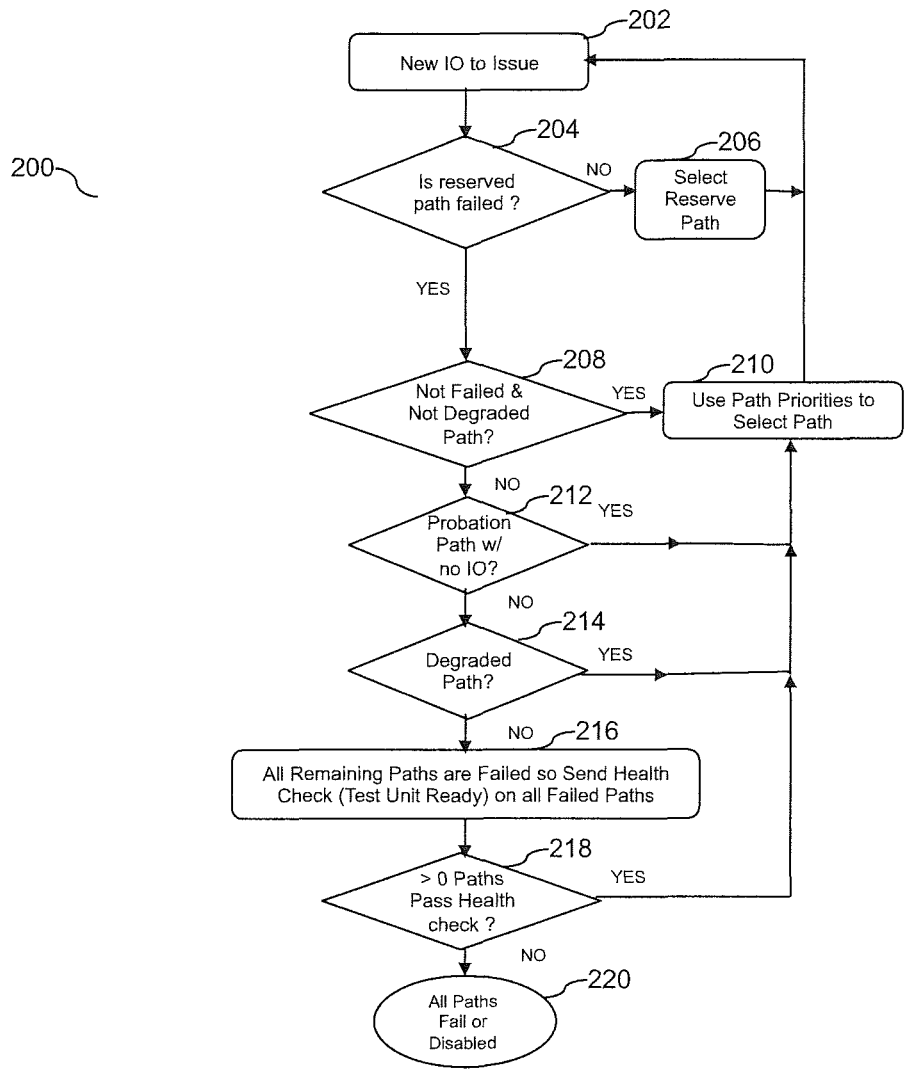
FIG. 2 illustrates a flow diagram of path selection for an input/output (I/O) in accordance with one or more embodiments.

Turning now to FIG. 2, a flow diagram 200 of path selection for an I/O is generally shown in accordance with one or more embodiments when the timeout policy is either fail_path or disable_path. In one or more embodiments, the processing shown in FIG. 2 is performed by the multipath driver of the server 102. The multipath driver of the server can include any combination of hardware and/or software to perform the processing shown in FIG. 2. As shown in FIG. 2, processing starts at block 202, when it is detected that a new I/O is about to issue on a reserved path, for example to service a data request from an application. At block 204, when a fail over algorithm or SCSI-2 reserve is being used, it is determined whether the reserved path has a failed state. As used herein, the term "fail over algorithm" refers to the processing described herein to perform PCM path selection, including the managing of the paths in the SAN network via activating paths determined to be healthy and deactivating paths determined to be unhealthy. If the reserved path does not have a failed state, then processing continues at block 206, where the reserved path is selected as the path for the new I/O. If it is determined at block 204, that the reserved path does have a failed state, then processing continues at block 208 where it is determined, for round robin or when a reserve has not yet been placed on a storage device for the path, whether a path that does not have a failed state and that does not have a sub-state of degraded is available for selection. If a path(s) that does not have a failing state and that is not in the degraded sub-state is available for selection, then processing continues at block 210 where path priorities are used to select the path. In accordance with one or more embodiments, a lower priority path in a non-degraded sub-state is selected ahead of a higher priority path having a sub-state of degraded.

At block 212, it is determined, in order to determine which path to reserve, whether a path that has a sub-state of probation that has not performed an I/O since entering the probation sub-state is available. If a path that has a sub-state of probation with no I/O is available, then processing continues at block 210 where path priorities are used to select the path. In accordance with one or more embodiments, a path is in the probation sub-state when it has passed a threshold number of consecutive health checks after previously being marked as being in the degraded sub-state. At block 214, if no paths that are in the probation sub-state are available, it is determined whether a path that is in the degraded sub-state is available. If a path in the degraded sub-state is available, then processing continues at block 210 where path priorities are used to select the path. At block 216 it is determined that all remaining paths have a state of failed so a health check (e.g., test unit ready) is sent out on all failed paths. At block 218, it is determined whether at least one path has passed the health check. If at least one path has passed the health check, then processing continues at block 210 where path priorities are used to select the path. If, as determined at block 218, none of the paths has passed the health check, then processing continues at block 220 where it is determined that all of the paths are in the failing or disabled state.

Figure 3:
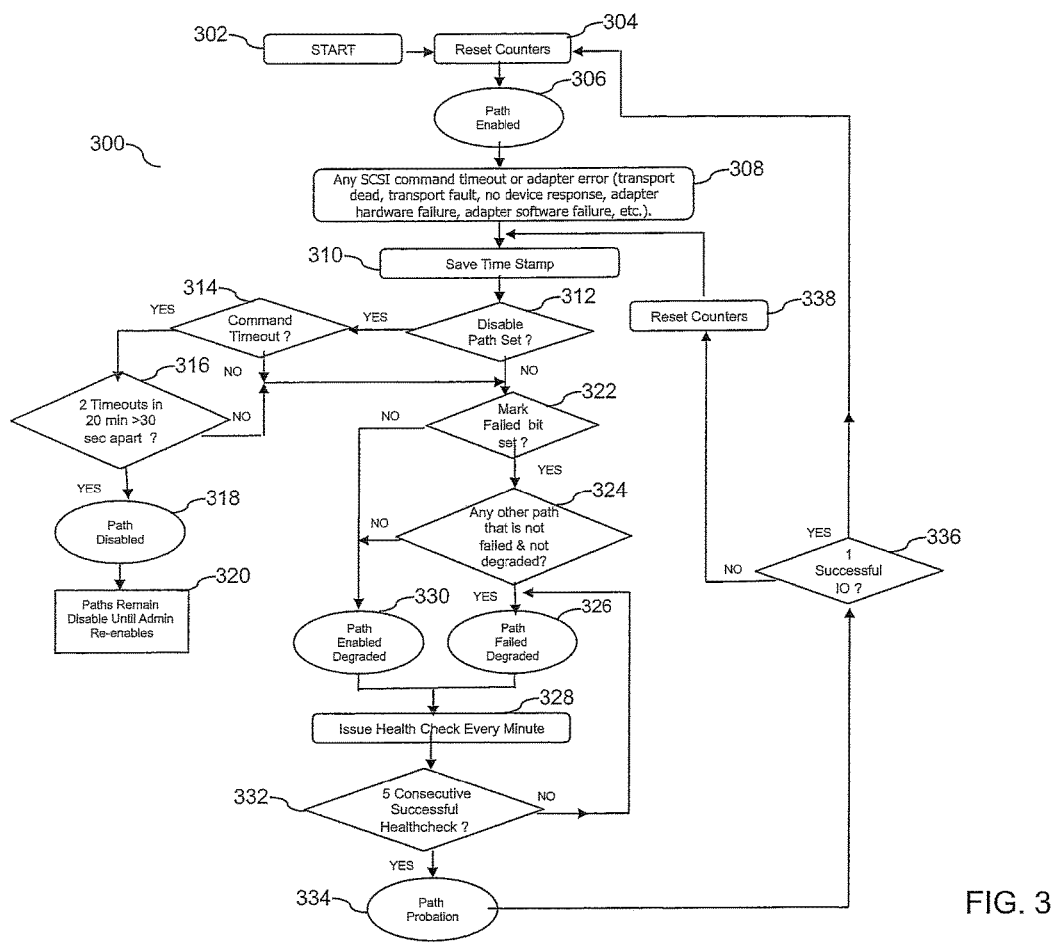
FIG. 3 illustrates a state flow diagram of a path control module (PCM) in accordance with one more embodiments.

Turning now to FIG. 3, a state flow diagram 300 of a PCM is generally shown in accordance with one more embodiments when the timeout_policy is either fail_path or disable_path. The state flow diagram shown in FIG. 3 can enhance PCM by adding additional cognitive analysis capability to more effectively recover from recurring intermittent faults. As shown in the embodiment of FIG. 3, there are separate flags from the failed or enabled states (i.e., a path can be failed|degraded, or enabled|degraded, etc.). In accordance with one or more embodiments, degraded and probation sub-states are mutually exclusive. In one or more embodiments, the processing shown in FIG. 3 is performed by the multipath driver of server 102. The multipath driver of the server can include any combination of hardware and/or software to perform the processing shown in FIG. 3.

As shown in FIG. 3, processing starts at block 302, the counters are reset at block 304, and at block 306, a path is set to a state of enabled. At block 308, a SCSI command timeout or adapter error is detected, such as, but not limited to: transport dead, transport fault, no device response, adapter hardware failure, and adapter software failure. In response to either a SCSI command timeout or an adapter error, the paths that encountered the error are marked as being in a sub-state of degraded and the time stamp of the error is saved at block 310. In accordance with one or more embodiments, depending on the error, the path is also marked as being in the failed state if it is not already in the failed state. In accordance with one or more embodiments, if a path is already in the failed|degraded state and another error is encountered on a health check, the time stamp is updated to the time of the most recent error.

If it is determined at block 312, that the timeout policy is set to disable path, then processing continues at block 314 to determine if there is a command timeout (e.g., a SCSI command timeout). If there is a command timeout, then processing continues at block 316 to determine whether there have been multiple command timeouts within a specific time interval, in which case block 318 is performed and the path is set to a permanently disabled state until an administrative re-enables the path at block 320. If a command timeout is not detected at block 314 or if it is determined at block 316 that multiple command timeouts within a specific time interval have not occurred, the processing continues at block 322. As shown in the embodiment in FIG. 3, the path will be disabled on the second (or some other programmable threshold number) timeout within twenty (or some other programmable threshold number) minutes, provided the timeouts are at least thirty (or some other programmable threshold number) of seconds apart. In accordance with one or more embodiments, if five (or some other number) commands are issued all at the same time, and they are all returned with command timeout at the same time, and thus count as a single timeout, as opposed to five timeouts.

At block 322 of FIG. 3, it is determined whether the path is in the failed state (e.g., is a failed bit set). If the failed bit is not set, then processing continues at block 330 where the state of the path is set to enabled|degraded. Alternatively if it determined at block 322 that the mark failed bit is set, then processing continues at block 324 to determine whether there is any other path that is not in the failed state and not in the degraded sub-state that could be used. If no such path is located, then processing continues at block 330 where the state of the path is set to enabled|degraded. If another path is available that is not in the failed state and not in the degraded sub-state, then processing continues at block 326 and state of the path is set to failed|degraded. In this manner, the path does not enter a failed state based on a command timeout if all other paths that are not in the failed state are in the degraded sub-state. Once a state of the path is set at block 330 or 326, processing continues at block 326 where a health check is performed every minute (or some other programmable threshold amount of time) to determine that status of the path. Once five (or some other programmable number) consecutive successful health checks are performed, as determined at block 332, the sub-state of the path is set to probation. Processing continues at block 336, where it is determined if one successful I/O has been performed on the path. If an I/O was successfully performed on the path, then processing continues at block 304 with the counters for the path being reset. If the I/O was not successful, as determined at block 336, processing continues at block 338 with the counters for the path being reset and then at block 310 where the time stamp is saved.

Thus, as shown in FIG. 3, the multipath driver of the PCM continues to issue health check commands to a path that is in a failed|degraded state. In accordance with one or more embodiments, when one of the health check commands completes successfully, the path is moved to an enabled|degraded state. An enabled|degraded path is eligible to be selected for regular I/O, but its use is avoided as long as the path remains in degraded sub-state. In one or more embodiments of the path selection algorithm, selection priority is given to a path that is in an enabled|not degraded state if there is at least one such path. If all paths have a sub-state of degraded, then a path having a degraded sub-state path will be used. In one or more embodiments, the path selection algorithm will also only select a path having a sub-state of probation if no previous I/O has been performed on the path since is entered the probation sub-state.

In accordance with one or more embodiments, when the algorithm is fail_over, paths will be switched if a path goes into a degraded sub-state without being in a failing state, as long as there are paths not having a degraded sub-state. However, paths will not be switched to the alternate controller on asymmetric logical unit access (ALUA) devices or between active and passive devices. In these one or more embodiments, controller state (active/optimized) has highest precedence, followed by the presence of the degraded flag (or sub-state), and then path priority. In one or more embodiments, when paths have priorities set, the degraded flag is favored over the priority (i.e., a lower priority non-degraded, or good, path is selected ahead of a higher priority degraded path).

In accordance with one or more embodiments described herein, when a device (e.g., a LUN) is presented to the host using multiple ports (multiple paths), complexity is added at the OS level. Getting the device to show up properly as a single pseudo device and having the OS understand the port characteristics can be supported by the use of multipathing at the host end. On the back-end storage side, active-active storage arrays expose multiple target ports to the host so that a host can access the unit of storage from any of the ports available on the active-active storage array. Being able to determine which ports are optimal (direct path to node owning the LUN) and which ports are non-optimal (indirect path to node owning the LUN) are important decisions for the host to process to optimize path selection. This can be implemented using a hardware based device specific module and standardization of SCSI standard called ALUA. ALUA has to do with paths and can be either on active-passive or active-active. Active-active means that a SAN has two nodes (or more), where each node is participating in taking requests from servers for access to storage. So in this way the traffic is load balanced across all nodes. Active-passive means only one controller at a time has control, and therefore all traffic goes through one node, and only when that node dies do the other controllers take over. Active-active therefore can have a much higher response and better throughput, however they are usually more expensive.

In accordance with one or more embodiments, when the timeout policy is fail_path, when an I/O or health check completes successfully on a path that is currently in a degraded sub-state, the last saved time stamp (i.e. last error) is checked and if more than five (or some other programmable number) times the amount of time it takes to perform the health check at block 328 have passed, then the path sub-state is changed to probation. In this manner, the multipath driver avoids using a path in a degraded sub-state for five health check intervals after it recovers. Once that time period passes, the path is considered to be in the probation sub-state and one user I/O is sent on that path. If that one I/O is performed without failing, as determined at block 336 of FIG. 3, then the path is opened up for regular use by transitioning from a sub-state of probation to a state of enabled. In this manner, the PCM is better able to handle corner cases that have caused undesirable recovery behavior and also at times detect and misinterpret unusual events occurring on the healthy fabric. These events at times can be normal and simply the result of recovery actions such as LUN reset and target reset.

Figure 4:
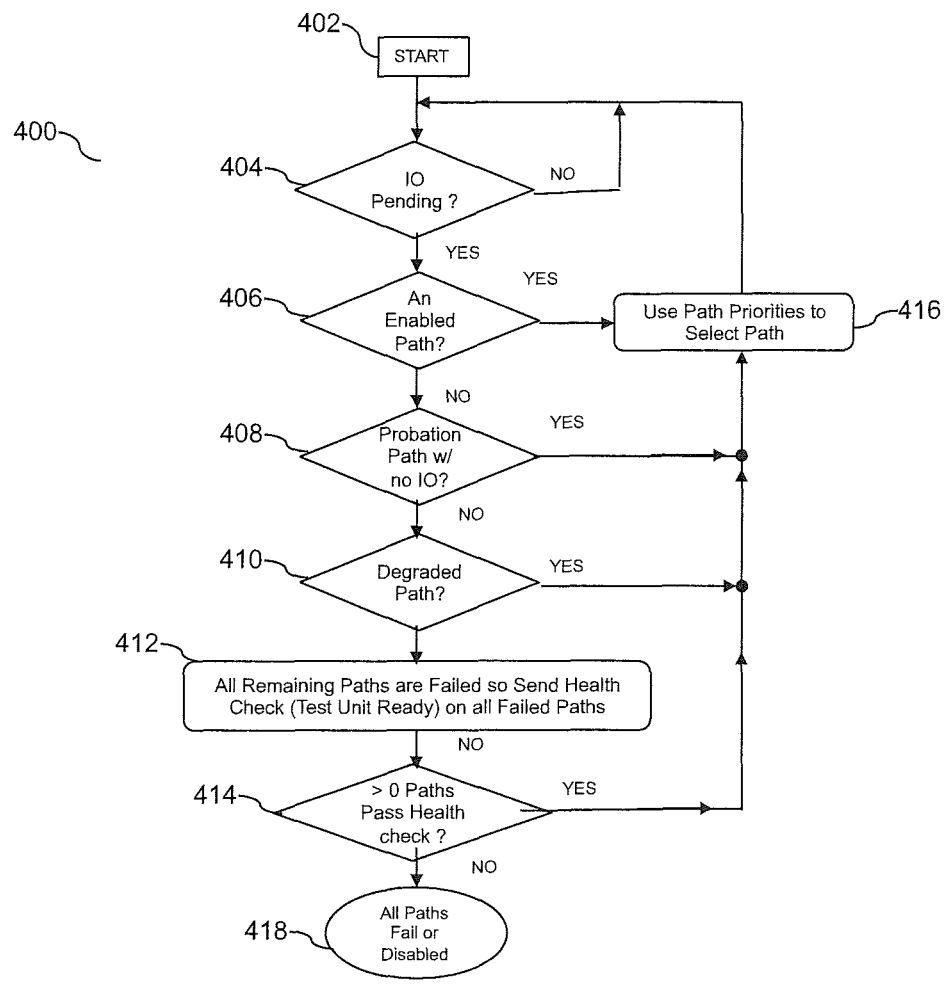
FIG. 4 illustrates a flow diagram of PCM path selection in accordance with one or more embodiments.

Turning now to FIG. 4, a flow diagram 400 of PCM path selection to determine which path to reserve is generally shown in accordance with one or more embodiments when the timeout_policy is either fail_path or disable_path. In one or more embodiments, the processing shown in FIG. 4 is performed by the multipath driver of the server 102. The multipath driver of the server can include any combination of hardware and/or software to perform the processing shown in FIG. 4. Processing starts at block 402 and at block 404 it is determined whether an I/O is pending. The loop between block 402 and 404 continues until it is determined that an I/O is pending and processing continues at block 406. At block 406, it is determined if a path having a state of enabled is available for the pending I/O. If one or more enabled paths are available, then processing continues at block 416 and path priorities are used to select the path. If it is determined at block 406, that no enabled paths are available then processing continues at block 408 to determine whether a path is available which has a sub-state of probation but no I/O requests currently outstanding on that path. If one or more paths with a sub-state of probation are available, then processing continues at block 416 and a path is selected. Otherwise, if a path with a sub-state of probation is not available, then processing continues at block 410 to determine whether path with a sub-state of degraded is available. If a path with a sub-state of degraded is available, then processing continues at block 416 and a path is selected. Block 412 is reached when all remaining paths are in a failed state, and a health check is sent (e.g., a test unit ready) on all failed paths. If there is at least one path that passes the health check, as determined at block 414, then processing continues at block 416 and a path is selected. Otherwise, block 418 is reached and all paths are in the failed state or the disabled state.

Figure 5:
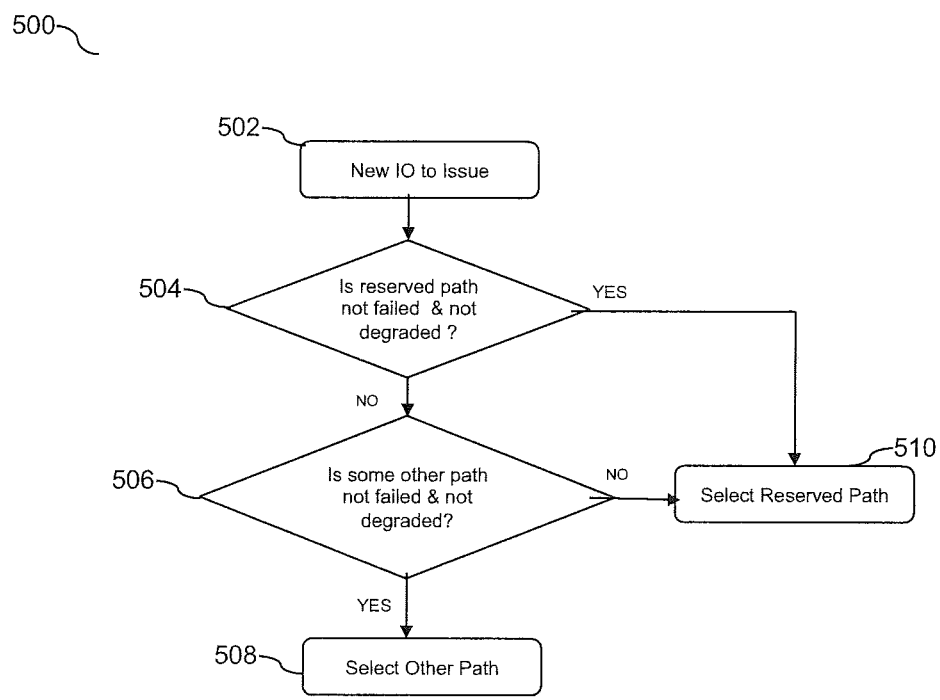
FIG. 5 illustrates a flow diagram of PCM path selection in accordance with one or more embodiments.

Turning now to FIG. 5, a flow diagram 500 of PCM path selection when using a path with SCSI-2 reserve is generally shown in accordance with one or more embodiments. In one or more embodiments, the processing shown in FIG. 5 is performed by the multipath driver of the server 102. The multipath driver of the server can include any combination of hardware and/or software to perform the processing shown in FIG. 5. As shown in FIG. 5, processing starts at block 502, when it is detected that a new I/O is about to issue on a reserved path, for example to service a data request from an application. At block 504, when a SCSI-2 reserve is being used, it is determined whether the reserved path is in an enabled state and a degraded sub-state. If the reserved path has a state of enabled and not degraded then processing continues at block 510, where the reserved path is selected. If it is determined at block 504, that the reserved path has a state of enabled|degraded, then processing continues at block 506, where it is determined whether another path has a state of enabled without the degraded sub-state. If it is determined at block 506 that no other path is enabled but not in degraded sub-state, then processing continues at block 510 and the reserved path is selected. Otherwise, if it is determined at block 506 that another path is enabled but not in degraded sub-state, then processing continues at block 508 and a path other than the reserved path is selected as shown for example, in blocks 208-220 of FIG. 2.

As shown in the embodiment of FIG. 5, the failover algorithm gives less priority to the path that has the reserve on it when that path is also in a degraded sub-state. This can allow the cognitive software to move off of the bad path more quickly when using the failover algorithm. In some cases without this change the code can get stuck constantly selecting the path that is experiencing errors, causing a virtual I/O hang. In contemporary implementations, when using SCSI reserves, the path selection algorithm must repeatedly select the same path, to avoid having the reserve thrash between paths. By marking paths as "degraded" after certain errors, embodiments described herein can identify that the reserved path is likely to experience more errors, and thus it is useful to move the reservation to the alternate path. Also note that if all paths are marked as having a sub-state of degraded, then the currently reserved path can be used.

Figure 6:
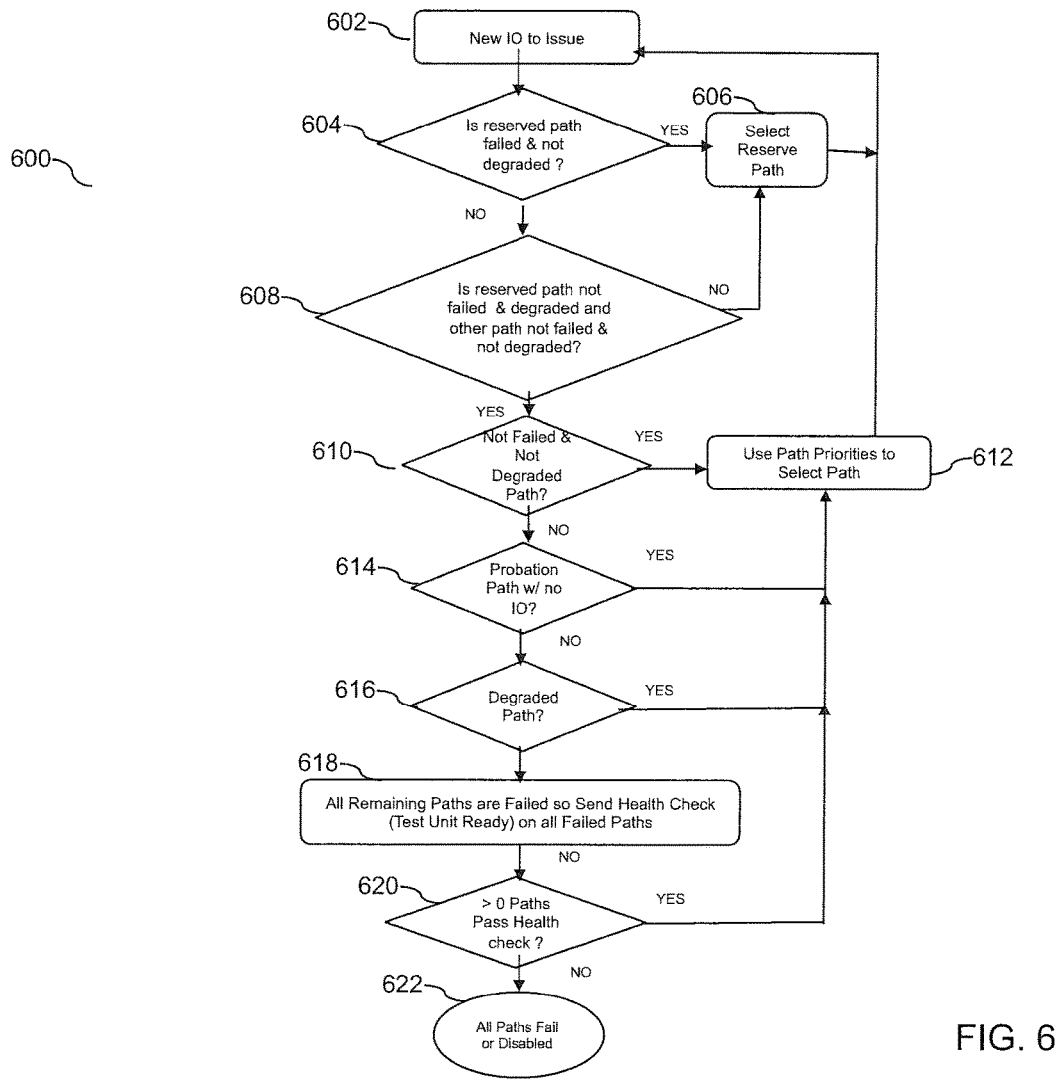
FIG. 6 illustrates a flow diagram of PCM path selection in accordance with one or more embodiments.

Turning now to FIG. 6, a flow diagram 600 of PCM path selection when using SCSI-2 reserve is generally shown in accordance with one or more embodiments when the timeout_policy is either fail_path or disable_path. In one or more embodiments, the processing shown in FIG. 6 is performed by the multipath driver of the server 102. The multipath driver of the server can include any combination of hardware and/or software to perform the processing shown in FIG. 6. Blocks 602 through 608 perform the processing described above with respect to blocks 502 through 506 and 510 of FIG. 5 to select a path when using a fail over algorithm or SCSI 2 reserve; and blocks 610 through 622 perform the processing described above with respect to blocks 208 through 220 of FIG. 2 to select a path using a round robin or when a reserve has not yet been placed on a storage device.

Figure 7:
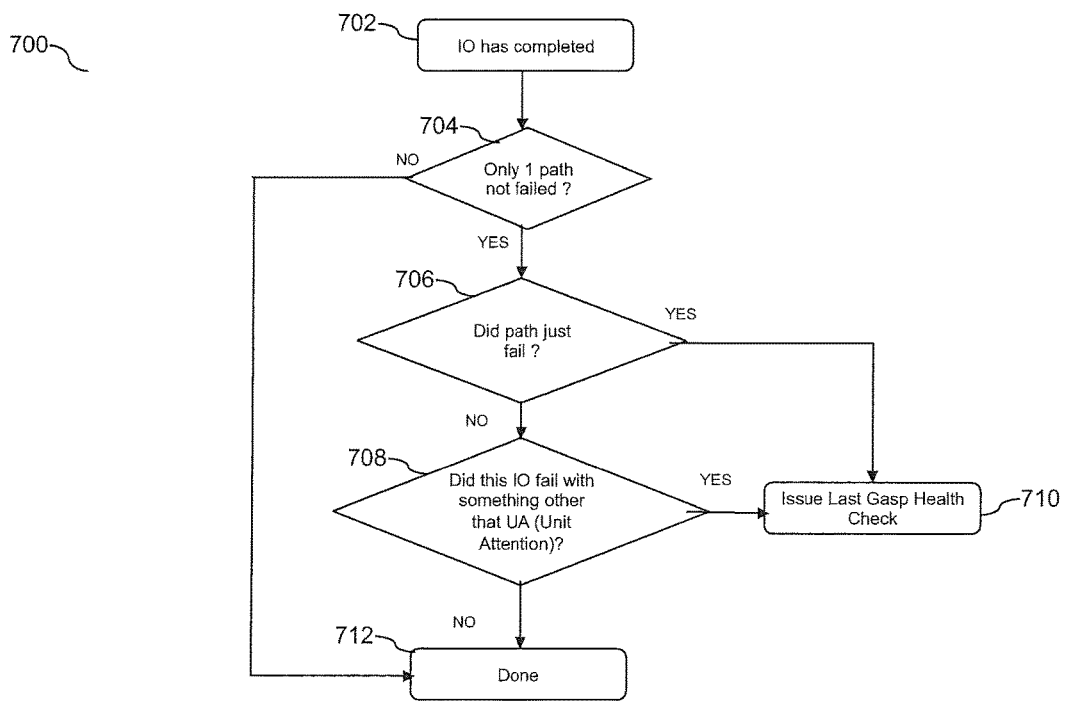
FIG. 7 illustrates a flow diagram of a PCM last gasp health check in accordance with one or more embodiments.

Turning now to FIG. 7, a flow diagram 700 of a PCM last gasp health check is generally shown in accordance with one or more embodiments. A last gasp health check is an emergency health check to recover paths when needed. If a device has only one non-failed path and an error is detected on that last path, the PCM can send a health check command on all of the other failed paths before retrying the I/O, regardless of the health check interval setting. This eliminates the need for a small health check interval to recover paths quickly. If there is at least one good path, the PCM discovers it and uses it before failing user I/O, regardless of the health check interval setting.

In one or more embodiments, the processing shown in FIG. 7 is performed by the multipath driver of the server 102. The multipath driver of the server can include any combination of hardware and/or software to perform the processing shown in FIG. 7. As shown in FIG. 7, processing starts at block 702, after an I/O has completed with either good status or with some indication of an error. At block 704 it is determined whether the path where the I/O was performed is the last path not in the failed state. If there are other paths not in the failed state then processing completes at block 712. If it is determined at block 704, that the path where the I/O was performed is the only path in the fabric that is not in the failed state, then block 706 is performed to determine whether the path just failed (i.e., the I/O did not complete without an error).

Thus, as shown in the embodiment of FIG. 7, the algorithm does not send the last gasp health check if the error just received was a UA. Normally when traversing the last good path, if an error occurs on that path, a health check is issued on the other path(s) in an attempt to recover them. But there really is no point in doing that if the error encountered on the good path was a UA which is an indication of task management being performed and not an actual error condition.

Figure 8:
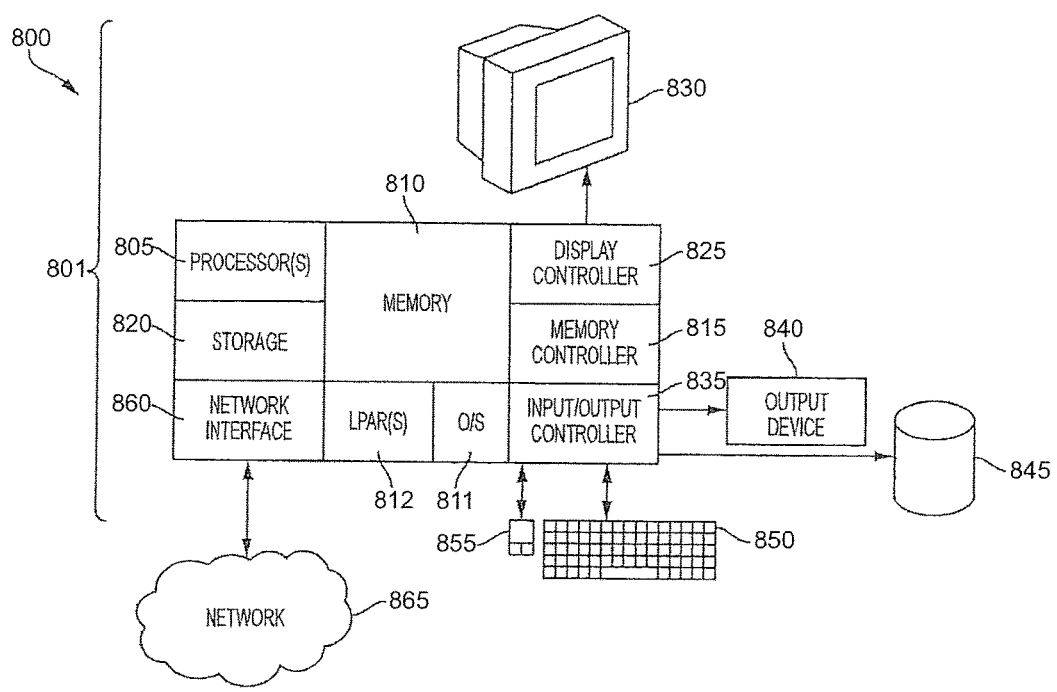
FIG. 8 illustrates a computer system for multipath driver cognitive analysis in accordance with one or more embodiments.

Turning now to FIG. 8, a computer system for multipath driver cognitive analysis is generally shown according to one or more embodiments. In accordance with one or more embodiments the processing described herein is performed by a processor located on a memory controller 815 and the memory devices are contained in a memory 810. The methods described herein can be implemented in hardware, software (e.g., firmware), or a combination thereof. In an exemplary embodiment, the methods described herein are implemented in hardware as part of the microprocessor of a special or general-purpose digital computer, such as a memory controller or mainframe computer.

In an exemplary embodiment, in terms of hardware architecture, as shown in FIG. 8, the computer 801 includes one or more processors 805, memory 810 coupled to a memory controller 815, and one or more input and/or output (I/O) devices 840, 845 (or peripherals) that are communicatively coupled via a local input/output controller 835. The input/output controller 835 can be, for example but not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 835 may include a plurality of sub-channels configured to access the output devices 840 and 845. The sub-channels may include fiber-optic communications ports.

The processor 805 is a hardware device for executing software, particularly that stored in storage 820, such as cache storage, or memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing instructions.

The memory 810 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The instructions in memory 810 may include one or more separate programs, each of which comprises an ordered listing of executable instructions for implementing logical functions. In the example of FIG. 8, the instructions in the memory 810 a suitable operating system (OS) 811. The operating system 811 essentially controls the execution of other computer programs and provides scheduling, input-output control, file and data management, memory management, and communication control and related services.

The memory 810 may include multiple logical partitions (LPARs) 812, each running an instance of an operating system. The LPARs 812 may be managed by a hypervisor, which may be a program stored in memory 810 and executed by the processor 805.

In an exemplary embodiment, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In an exemplary embodiment, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In an exemplary embodiment, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the instructions in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute instructions stored within the memory 810, to communicate data to and from the memory 810, and to generally control operations of the computer 801 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for transmitting data in a network, the system comprising:
    at least one data transmission port configured for connection to at least one shared data storage device via a plurality of paths of the network;
    a memory having computer readable instructions; and
    a processor for executing the computer readable instructions, the computer readable instructions including:
        detecting a recurring intermittent error in one of the paths of the network;
        determining whether a previous recovery action was performed on the path;
        in response to determining that a previous recovery action was not performed on the path:
            preventing the data transmission port from accessing the path for a specified time period by moving the path into a degraded sub-state, wherein the specified time period is based on a number of paths of the plurality of paths being accessible to the data transmission port as usable paths; and
            providing the data transmission port access to the path subsequent to the specified time period; and
        in response to determining that a previous recovery action was performed on the path:
            providing the data transmission port access to the path.

2. The system of claim 1, wherein the instructions further include:
    determining whether to use a previously selected reserved path of the plurality of paths or an other one of the plurality of paths to perform an input/output (I/O) operation to the at least one shared storage device, wherein the other path is selected to perform the I/O based on the reserved path being in the degraded sub-state and the other path not being in the degraded sub-state.

3. The system of claim 1, wherein the instructions further include:

determining whether to perform a last gasp health check on the path;

performing the last gasp health check on the path based on the path being the last path in the plurality of paths that is not failed and a cause of the previous recovery action being a condition other than a unit attention (UA) indicator from one of the at least one shared data storage device; and skipping the last gasp health check on the path based on the cause of the previous recovery action being a UA indicator from one of the at least one shared data storage device.

4. The system of claim 1, wherein the specified time period is further based on a number of successful health checks being performed on the path subsequent to the preventing.

5. The system of claim 1, wherein the computer instructions further include:

subsequent to the preventing and prior to the providing:
issuing health checks on the path;
determining that a specified number of the health checks were successful;
issuing an I/O on the path; and
determining that the I/O was successful, wherein the providing the data transmission port access to the path is further based on determining that the I/O was successful.

6. The system of claim 1, wherein the network is a storage area network.

7. A method comprising:

detecting, by a processor, a recurring intermittent error in a path of a network in a system that includes at least one data transmission port configured for connection to at least one shared data storage device via a plurality of paths of the network;

determining whether a previous recovery action was performed on the path;

in response to determining that previous recovery action was not performed on the path:
preventing the data transmission port from accessing the path for a specified time period by moving the path into a degraded sub-state, wherein the specified time period is based on a number of paths of the plurality of paths being accessible to the data transmission port as usable paths; and
providing the data transmission port access to the path subsequent to the specified time period; and in response to determining that a previous recovery action was performed on the path:
providing the data transmission port access to the path.

8. The method of claim 7, further comprising:

determining whether to use a previously selected reserved path of the plurality of paths or an other one of the plurality of paths to perform an input/output (I/O) operation to the at least one shared storage device, wherein the other path is selected to perform the I/O based on the reserved path being in the degraded sub-state and the other path not being in the degraded sub-state.

9. The method of claim 7, further comprising:

determining whether to perform a last gasp health check on the path;

performing the last gasp health check on the path based on the path being the last path in the plurality of paths that is not failed and a cause of the previous recovery action being a condition other than a unit attention (UA) indicator from one of the at least one shared data storage device; and skipping the last gasp health check on the path based on the cause of the previous recovery action being a UA indicator from one of the at least one shared data storage device.

10. The method of claim 7, wherein the specified time period is further based on a number of successful health checks being performed on the path subsequent to the preventing.

11. The method of claim 7, further comprising:

subsequent to the preventing and prior to the providing:
issuing health checks on the path;
determining that a specified number of the health checks were successful;
issuing an I/O on the path; and
determining that the I/O was successful, wherein the providing the data transmission port access to the path is further based on determining that the I/O was successful.

12. The method of claim 7, wherein the network is a storage area network.

13. A computer program product comprising a computer readable storage medium having program instructions embodied therewith, the program instructions executable by processing circuitry to cause the processing circuitry to perform:

detecting a recurring intermittent error in a path of a network in a system that includes at least one data transmission port configured for connection to at least one shared data storage device via a plurality of paths of the network;

determining whether a previous recovery action was performed on the path;

in response to determining that a previous recovery action was not performed on the path:
preventing the data transmission port from accessing the path for a specified time period by moving the path into a degraded sub-state, wherein the specified time period is based on a number of paths of the plurality of paths being accessible to the data transmission port as usable paths; and
providing the data transmission port access to the path subsequent to the specified time period; and in response to determining that previous recovery action was performed on the path:
providing the data transmission port access to the path.

14. The computer program product of claim 13, wherein the program instructions further cause the processor to perform:

determining whether to use a previously selected reserved path of the plurality of paths or an other one of the plurality of paths to perform an input/output (I/O) operation to the at least one shared storage device, wherein the other path is selected to perform the I/O based on the reserved path being in the degraded sub-state and the other path not being in the degraded sub-state.

15. The computer program product of claim 13, wherein the program instructions further cause the processor to perform:

determining whether to perform a last gasp health check on the path;

performing the last gasp health check on the path based on the path being the last path in the plurality of paths that is not disabled and a cause of the previous recovery action being a condition other than a unit attention (UA) indicator from one of the at least one shared data storage device; and skipping the last gasp health check on the path based on the cause of the previous recovery action being a UA indicator from one of the at least one shared data storage device.

\* \* \* \* \*